(No Model.)
H. MEISTER.
CHUCK AND DRILL.
No. 492,733. Patented Feb. 28, 1893.
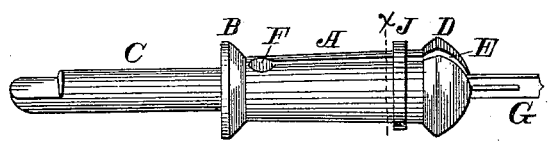
Fig. 1.
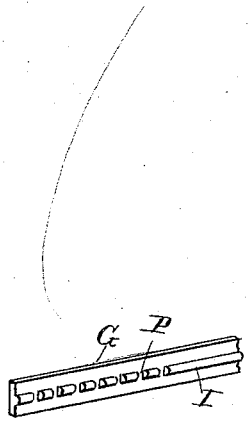
Fig. 8.
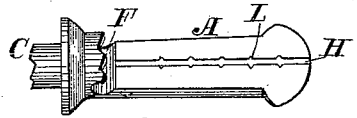
Fig. 2.
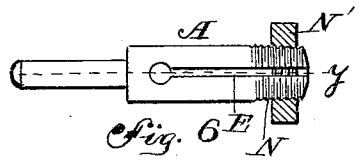
Fig. 6.
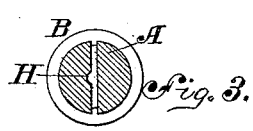
Fig. 3.
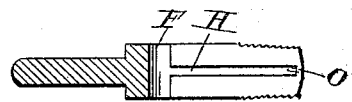
Fig. 7.
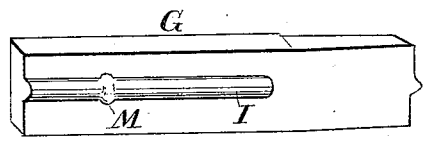
Fig. 4.
Fig. 5.
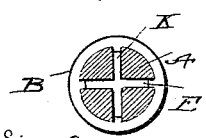
Fig. 10.
WITNESSES:
N. Mason
John Thomas
INVENTOR:
H. Meister
BY
ATTORNEY.
THE NORRIS PETERS CO., PHOTO-LITHO., WASHINGTON, D. C.

UNITED STATES PATENT OFFICE.

HERMAN MEISTER, OF NEW YORK, N. Y.

CHUCK AND DRILL.

SPECIFICATION forming part of Letters Patent No. 492,733, dated February 28, 1893.

Application filed November 2, 1891. Serial No. 410,632. (No model.)

*To all whom it may concern:*

Be it known that I, HERMAN MEISTER, a citizen of the United States, and a resident of New York, in the county of New York and State of New York, have invented certain new and useful Improvements in Chucks and Drills, of which the following is a specification.

The object of my invention is to construct a new and improved form of drill, and chuck for receiving same. It has been customary with certain classes of drills to provide the body of round steel, which was ground down at one end so as to provide a flattened portion to serve as the cutting or drilling end, the other end being inserted in a round hole in the chuck. It is a difficult test to make a drill in that manner and occupies much time on the part of the workman. In addition thereto the greatest care must be exercised to secure steel wire which will exactly fit the bore of the chuck or it will not be held firmly in the chuck, hence it is exceedingly liable to and does break by the vibration which takes place in rotating the chuck and drill. I overcome these objections by forming the drill of flattened or rectangularly shaped, (in cross section) steel strips, of the proper width and thickness to serve the purpose, and on one or both sides I provide a rib. The chuck is provided with a tapering body and enlarged head which is longitudinally slotted, and one or both of the inner faces have grooves to receive the ribbed drill. The tapering body of the chuck has thereon a ring which serves to tighten the wings of the chuck and hold the drill firmly therein all of which will, now be set forth in detail.

Figure 1 is a view of the chuck and drill combined. Fig. 2 a perspective view of the chuck body, with one of the wings cut away. Fig. 3 a cross section of the chuck body looking toward the rear end of the chuck. Figs. 4 and 5 perspective views, enlarged, of the drills. Figs. 6 a side view of a preferred form of chuck. Fig. 7 a longitudinal section through line $y$ of Fig. 7, Fig. 8 a perspective view of portion of a drill adapted to fit the chuck shown in Fig. 7, and Fig. 9 a modified form of drill shank. Fig. 10, is a cross section of a modification of the chuck.

One form of the chuck body A, is made round and slightly tapering toward the base B, as shown in Fig. 1, and from the base projects a shank C, adapted to be placed in the lathe, brace or other device which turns the same. The front end of the chuck body has an enlarged head D and through this and the body of the chuck I form a slot E centrally, which terminates at a cross bore F near the base B. Two wings are thus formed between which I place the drill G. The slot is made sufficiently wide or the wings are far apart enough to permit the insertion of different widths of drills, but, of course the drill bodies must all be of the same thickness, suited to the chuck. One or both of the walls forming the slot E, has centrally a groove H, to receive the rib I on the side of the drill G. The body A, of the chuck, has thereon a ring J, adapted to be moved to and fro, so that when it is designed to tighten the wings the ring is moved toward the enlarged end so that it will compress the wings. The cross bore F, by weakening the walls at the bases of the wings afford a ready means for slightly expanding the wings, so that the drill can be forced and held securely and the ring is employed to permit any vibration of the wings.

The other and preferred form of chuck body is found in Figs. 6 and 7. In this form the body A is made plain, and devoid of the head D or enlarged base B. The end of the chuck is exteriorly threaded, however, as at N to receive a nut N' and this nut serves to clamp together the jaws of the chuck instead of the ring J shown in Fig. 1. This form of chuck is more simple and easier made. In this figure the longitudinally formed groove on the inner face of the jaw terminates near the end, as shown at O, and the drill shank G has a rib I on one or both sides with gains P at intervals, so that when the body of the drill lies in the slot E the part O at the end of the groove H will rest in one of said gains.

Instead of having the groove H placed in one or both of the walls of the groove, as shown in Fig. 3, the slot E may have a like slot K, at right angles thereto, as shown in Fig. 10, and in some cases such formation is easier than to make the groove, and I do not, therefore, confine myself to the grooved wall. The groove H may have at regular intervals notches or detents L, and the drill have its rib I flattened out, as shown at M so that when the drill is placed in the chuck the expanded or flattened portion M will rest in one of the detents L. The object of these notches as well as the gains P, is to provide a means for adjusting the drill so that its projecting end can be regulated. It is frequently desirable to be able to bore a certain depth without making it necessary to measure the projecting end of the drill, and by this means I am able to accomplish it and hold the drill at various points. The detents or the notches may be placed as close together as desired so that a very small longitudinal adjustment can be made.

The manner of constructing the chuck with the cross slots E K, as shown in Fig. 10 affords considerable advantages over the single slotted chuck, because it enables me to insert the square shank Q of the drill shown in Fig. 9, and for purposes where the exact placing of the drill in the chuck is not necessary this form of drill and chuck is preferred, but ordinarily I propose to make the chuck in the form shown in Figs. 1 and 2, and make corresponding drill shanks, as in Figs. 4 and 5 to fit.

What I claim as new is—

1. A drill chuck having a tapering body and a longitudinal slot therein with a notched groove terminating in the wall near the end, jointly with a flat bodied drill having a rib with gains therein, substantially as set forth.

2. A drill composed of a flattened body, rectangular in cross section, having a rib with cross gains therein, as shown, in combination with a slotted chuck, having a groove centrally provided with cross gains at regular intervals, substantially as set forth.

Signed at New York, in the county of New York and State of New York, this 22d day of January, A. D. 1891.

HERMAN MEISTER.

Witnesses:
N. MASON,
JOHN THOMAS.